Aug. 31, 1954   R. S. ANDERSON ET AL   2,687,612
PEAK HOLDING FUEL CONTROL FOR INTERNAL-COMBUSTION ENGINES
Filed June 24, 1952   2 Sheets-Sheet 1
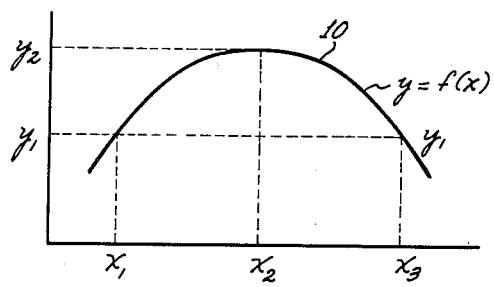
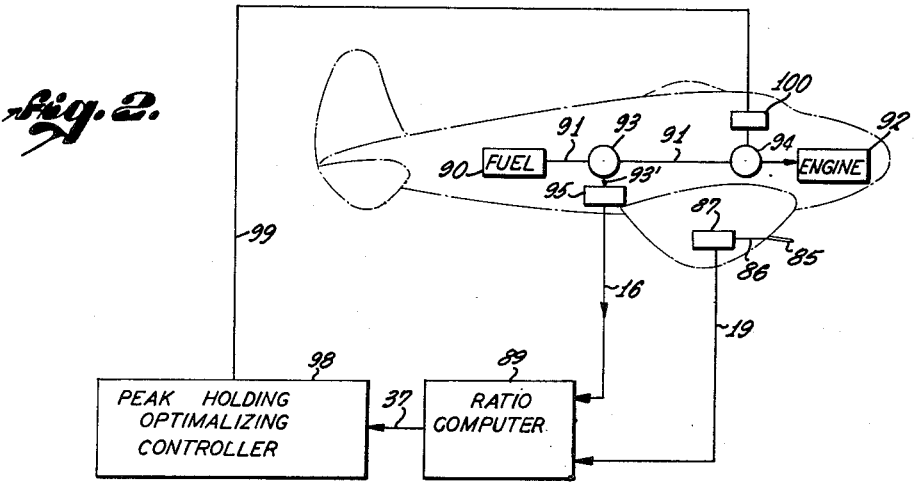
RICHARD S. ANDERSON &
JAMES ROBERT SHULL,
INVENTORS.
BY Gerald H. Peterson
ATTORNEY.

RICHARD S. ANDERSON &
JAMES ROBERT SHULL,
INVENTORS.

Patented Aug. 31, 1954

2,687,612

UNITED STATES PATENT OFFICE 2,687,612

PEAK HOLDING FUEL CONTROL FOR INTERNAL-COMBUSTION ENGINES

Richard S. Anderson, Inglewood, and James R. Shull, Redondo Beach, Calif.

Application June 24, 1952, Serial No. 295,282

16 Claims. (Cl. 60—39.28)

This invention relates to an automatic controller and to an operating system incorporating such a controller for use in a situation where a dependent variable is an optimum function of an independent variable, in which system the independent variable is controlled in accordance with the dependent variable to maintain the dependent variable at or near its optimum. The optimum value is usually a maximum value but may be a minimum value in some instances.

Many operating systems are controlled by adjusting a controlling means which varies an independent variable of the system and thereby causes a dependent variable of the system to pass through an optimum or peak; for example, in the case of an internal combustion power plant of an airplane, the power plant throttle varies the independent variable of rate of fuel consumption, which independent variable may be expressed in pounds of fuel per hour. When the airplane is in flight the dependent variable of distance travelled per unit of fuel consumed, which may be expressed in miles travelled per pound of fuel, will be an optimum at some particular value of rate of fuel consumption. Thus, as the independent variable, rate of fuel consumption, is varied from values below and above said particular value, the value of the dependent variable, miles per pound of fuel, will pass through a peak of maximum miles per pound of fuel consumption.

For the purpose of the present disclosure, the independent variable, which in this example is pounds of fuel per hour controlled by the throttle, is referred to as the input variable of the system, and the dependent variable, which in this instance is the miles travelled per pound of fuel, is herein referred to as the output variable of the system. In the present invention the input variable of the system is controlled by the output from the controller, and the output variable of the system is fed to the controller as the input thereto. Also, the output variable of the system is used to control the system input variable so that the system input or independent variable is controlled in accordance with the system output or dependent variable.

In accordance with one embodiment of our invention the dependent, or output, variable of an airplane, namely, distance travelled per unit of fuel consumed or miles per pound of fuel, is obtained by measuring the air speed and fuel rate by known instruments commonly used for such purposes. These quantities are converted to electrical voltages directly proportional thereto by appropriate transducers, and the voltage representing air speed in miles per hour is divided by the voltage representing fuel consumed in pounds per hour, to obtain a resulting voltage representing distance travelled per unit of fuel consumed in miles per pound of fuel. This resulting voltage representing the dependent or output variable of the airplane is transmitted to the automatic controller of the present invention which regulates the throttle to maintain this dependent variable at or near its optimum or maximum value. This automatic controller may be aptly called a peak holding optimizing controller. The operation of the controller is characterized by the use of an input signal, in this instance, a voltage signal directly proportional to the dependent or output variable from the airplane in terms of miles travelled per pound of fuel and is further characterized by the generation of the signals for use in controlling the throttle and fuel rate to maintain the value of miles per pound at maximum. Thus, the peak holding optimalizing controller receives an electrical signal directly proportional to the dependent or output variable of a system in which such variable is an optimum function of an independent variable and generates signals to control the independent variable of the system. In the case of aircraft having either a reciprocating engine or a turbojet power plant, the indepedent variable of fuel rate is adjusted by varying the position of the throttle, but other independent variables may be used. For example, in an aircraft having a reciprocating engine, the propeller pitch may be controlled instead of the throttle.

The invention particularly pertains to a peak holding optimizing controller, as referred to above, and, for example, such as described in Principles of Optimizing Control Systems and Application to the Internal Combustion Engine by C. S. Draper and Y. T. Li, published by the American Society of Mechanical Engineers, September 1951. The theory of such a system of control is set forth on pages 39 to 41 of this publication and a specific embodiment of such a controller is described on pages 87 to 95.

With respect to the controller, the general object of the invention is to provide an efficient and dependable peak holding optimizing controller, with special reference to simplicity of mechanism and operation. While the invention is broadly applicable to peak holding control for various specific purposes, it has special utility as a cruise control system for regulating the power developed by an aircraft power plant to maintain a high ratio of air speed to fuel consumption, and this invention also includes such a combination. Such an embodiment of the invention will be described herein for the purpose of disclosure and illustration, as well as to provide adequate guidance for those skilled in the art who may have occasion to apply the same principles to other specific purposes in various fields.

A special object of the preferred practice of the invention is to provide a rugged, durable control system of this character that may be depended upon to withstand the severe conditions imposed by aircraft flight, especially military aircraft. The problem in this application of the invention is to avoid the use of fragile components such as vacuum tubes which are vulnerable to environmental damage and have poor reliability and low life expectancy.

Broadly described, the objects of the invention are attained by using two co-acting electrical signal circuits in the peak holding optimalizing controller, one of the circuits being energized with what may be termed an output signal voltage to follow changes in the output variable of the airplane, the other circuit being energized with what may be termed a reference signal voltage. The reference signal voltage reaches a maximum when the output signal voltage passes through its peak magnitude and then the reference signal voltage holds its peak value as the output signal drops. When the difference in magnitude between the unchanging reference signal voltage and the decreasing output signal voltage reaches a predetermined magnitude, a reversible drive means that operates continuously to progressively change the input variable of the airplane is reversed and the reference signal voltage is decreased automatically to a starting magnitude for repetition of the control cycle.

With reference to the use of rugged components for the control system, it is contemplated that the above described differential action and automatic cycle control will be accomplished largely by potentiometer means together with suitable electro-magnetic means. In this regard the preferred practice of the invention described herein is particularly characterized by the use of a differential relay. One coil of the differential relay is energized by the output signal and the other coil is energized under control of the first coil through the medium of a motor actuated potentiometer. When the armature of the differential relay is swung to one limit position by preponderance of output signal over reference signal, the motor actuated potentiometer responds by increasing the reference signal to correspond to the output signal. On the other hand when the relay armature is swung to its opposite limit position by preponderant reference signal, the direction of shift of the input variable by the previously mentioned input drive means is reversed and the motor actuated potentiometer also responds to increase the reference signal to maximum and then decreases it to a relatively low starting magnitude for repetition of the cycle.

A further object in this selected practice of the invention is to provide a simple and equally rugged ratio computing mechanism to divide the air speed signal by the rate of fuel consumption signal to provide the desired output signal for the control system.

The various objects and advantages of the invention may be understood from the following detailed description considered with the accompanying drawings.

In the drawings, which are to be regarded as merely illustrative,

Fig. 1 is a graph showing how a system output variable $y$ varies as an optimum function of an input variable $x$;

Fig. 2 is a schematic block diagram of an airplane cruise control system;

Figure 3:
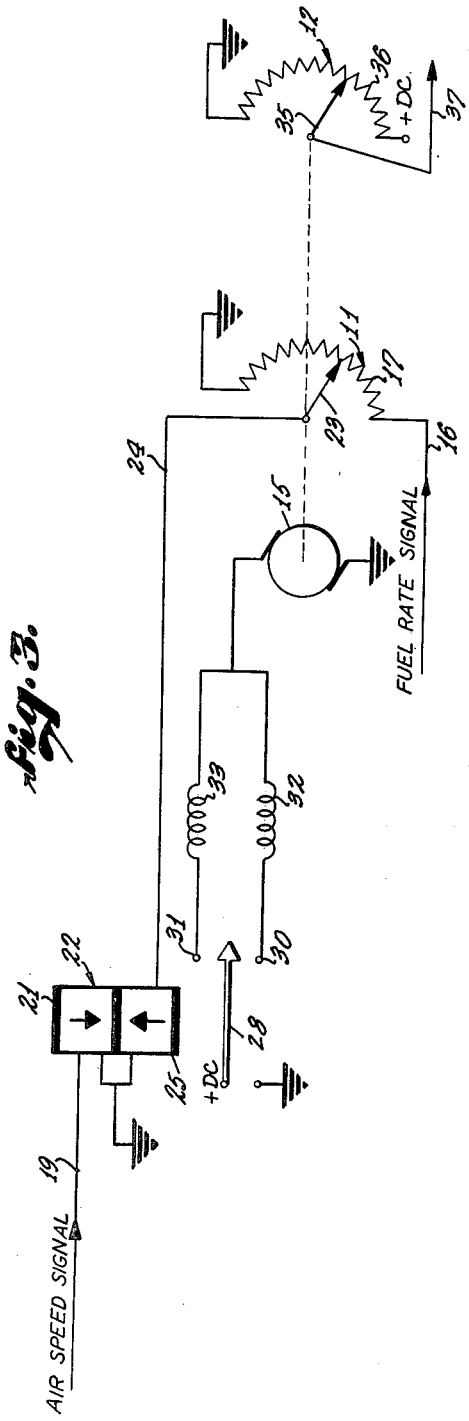
Fig. 3 is a wiring diagram of the ratio computer in the cruise control system.

Fig. 1 is a graph in which the curve 10 plots the changing values of an output variable $y$ as an input variable $x$ shifts through a range corresponding to a range of values of $y$ including an optimum. It is contemplated that the input variable $x$ will be automatically controlled to oscillate across a stabilization zone having limit values $x_1$ and $x_3$ which correspond to the lower permissible value $y_1$ of the output variable. At an intermediate point in this range, the input value $x_2$ corresponds to the peak output value $y_2$.

The schematic block diagram shown in Fig. 2 represents the selected embodiment of the invention as a control system for regulating the cruising speed and rate of fuel consumption of an airplane for maximum travel per unit of fuel. As shown in the diagram, the speed indicating signal from the air speed measuring device such as a Pitot tube 85 is passed by way of line 86 to a transducer 87 which converts this signal to an electrical voltage by means known in the art and this electrical voltage is passed by line 19 to ratio computer 89. Fuel for the airplane is led from fuel tank 90 by way of line 91 to engine 92 through fuel meter 93 under control of a throttle 94 in fuel line 91. The signal from meter 93 is passed by way of line 93 to transducer 95 which converts the meter signal into an electrical voltage proportional to the fuel rate supplied and consumed by the engine. This electrical voltage is passed by line 16 to ratio computer 89.

Ratio computer 89 divides the voltage from line 19 representing travel distance per unit of time by the voltage in line 16 representing fuel consumed per unit of time and by way of line 37 delivers a resulting voltage directly proportional to travel distance per unit of fuel consumed. The latter voltage which represents the output or dependent variable of the airplane system is fed to the peak holding optimalizing controller 98 which delivers control signals by way of line 99 to an actuating means 100 that controls the throttle 94. The peak holding optimalizing controller 98 operates to control the throttle 94 in such manner that the voltage in line 37 fed to controller 98 and representing the travel distance per unit of fuel consumed will be maintained at or near its maximum.

Various arrangements well known to the art may be employed to supply the air speed signal and the fuel rate signal to the ratio computer. In the present example, as heretofore stated, both the air speed signal and the fuel rate signal are voltage signals and the output signal delivered to the peak holding optimalizing controller is a resulting voltage signal.

Various ratio computers known to the art may be employed in the system. Fig. 3 shows by way of example, a ratio computer for voltage signals which includes two potentiometers or voltage dividers generally designated 11 and 12 respectively, both of which are controlled by a reversible motor 15. The fuel rate voltage signal from the fuel meter is carried by a wire 16 to one end of the resistance element 17 of the potentiometer 11, the other end of the resistance element being grounded. The air speed voltage signal is carried by a wire 19 to a first coil 21 of a differential relay generally designated 22. Voltage from the wiper 23 of the potentiometer 11 is carried by a wire 24 to the second coil 25 of the differential relay, both coils of the relay being grounded as shown.

The differential relay 22 has an armature 28 that takes any one of three positions as determined by relative current flow in the two coils. The two coils 21 and 25 exert magnetic force on the armature 28 in opposed directions, as indicated by their respective arrows in Fig. 3, so that preponderance of current flow in coil 21 shifts the armature to one limit position against a contact 30 and preponderance of current flow in coil 25 moves the armature to an opposite limit position against a contact 31, the armature seeking a neutral position shown in full lines in Fig. 3 when current flow in the two coils is approximately balanced. (It will be understood that as is customary with differential relays, armature 28 will be placed in a manner to be balanced between the two coils 21 and 25.) When armature 28 is moved to its limit position against contact 30, it energizes the motor 15 through a field coil 32 for rotation in a direction to shift wiper 23 along resistance element 17 in a direction to increase the voltage to coil 25 until the currents in coils 21 and 25 are balanced to return the armature 28 to neutral position. On the other hand, when armature 28 moves against the other contact 31, it energizes motor 15 through a second field coil 33 for rotation in the opposite direction to move wiper 23 along resistance element 17 in the direction to decrease this voltage to coil 25 until armature 28 is again in neutral position. When the two coils balance with the armature 28 in its neutral position, motor 15 is deenergized.

It is apparent that by virtue of the described arrangement, the wiper 23 will assume a position on the resistance element 17 at which the voltage of the wiper will be substantially equal to the air speed voltage signal. Thus, since the voltage at wiper 23 will be proportional to both the fuel rate voltage signal and the length of resistance element 17 to point of contact, the position of the wiper 23 on 17 will vary directly with the ratio between the air speed voltage signal and the fuel rate voltage signal.

The wiper 35 of the second potentiometer 12 traverses a resistance element 36, one end of which is connected to a constant voltage supply as shown, the other end being grounded. The second wiper 35 is operatively connected on the same shaft with the first wiper 23 so that the position of wiper 35 relative to resister element 36 is always the same as the position of wiper 23 relative to resistance element 17. It is apparent that the voltage of the second wiper 35 is a measure of the desired ratio so that a wire 37 connected thereto will deliver the element voltage signal proportional to the ratio to the peak holding optimalizing controller.

Figure 4:
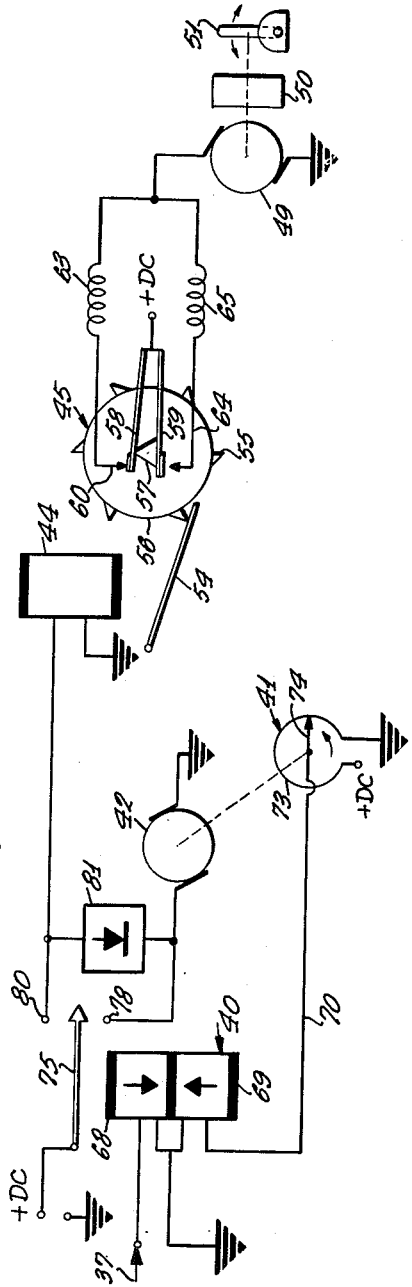
Fig. 4 is a wiring diagram of the peak holding optimalizing controller in the cruise control system.

The presently preferred components of the peak holding optimalizing controller, which is shown in Fig. 4, include a differential relay generally designated 40, a potentiometer or voltage divider generally designated 41, a D. C. motor 42 for driving the potentiometer, and a latching relay 44 including a switch mechanism generally designated 45. The purpose of the switch mechanism 45 is to control the energization and direction of rotation of a reversible direct current motor 49 which acts through a gear box 50 to oscillate the previously mentioned input variable $x$. In this example, chosen by way of illustration, the gear box 50 reciprocates the throttle 51 of the power plant of the aircraft.

The latching relay 44 has an armature 54 in the form of a pawl to engage successively the spaced teeth 55 of a ratchet wheel 56. Thus, energization of the latching relay 44 causes the ratchet wheel 56 to make one-sixth of a rotation. The ratchet wheel 56 carries a triangular cam 57 which alternately displaces flexible contacts 58 and 59 respectively in the step by step rotation of the ratchet wheel 56. Thus, in the position shown in Fig. 4, the triangular cam presses contact 58 against a fixed contact 60 to energize the motor 49 through a field coil 63 to drive the throttle 51 in one direction. On the next advance of the ratchet wheel 56, the triangular cam releases the flexible contact 58 to break the circuit through the field coil 63 and displaces the second flexible contact 59 against a fixed contact 64 to energize the motor 49 through the second field coil 65 for movement of the throttle 51 in the opposite direction. Thus, the motor 49 continually drives the throttle 51 in one direction or the other and reverses its direction each time the latching relay 44 is energized.

The output voltage signal received by the wire 37 from the ratio computer energizes a first coil 68 of the differential relay 40 and a second coil 69 of the differential relay is energized by current received through a wire 70 of the potentiometer 41. The resistance element 73 of the potentiometer 41 is connected at one end to a constant D. C. source, the other end being grounded, and the wiper 74 of the potentiometer is connected to the wire 70. Wiper 74 is driven by the motor 42 to increase the voltage to the second relay coil 69, which voltage constitutes the voltage reference signal. Both coils 68 and 69 are grounded as shown.

When the two coils 68 and 69 are substantially balanced, the differential relay armature 75 that is controlled by the two coils takes the neutral position shown in Fig. 4. When the magnetic force from coil 68 predominates over that from coil 69, armature 75 which is connected to the D. C. source as shown, is swung against a contact 78 to complete a circuit for energizing motor 42. Motor 42 rotates in the direction to drive the potentiometer wiper 74 in the direction to increase the voltage and current flow through coil 69.

It is apparent that as the output voltage signal rises to increase current flow in coil 68, motor 42 will automatically drive the potentiometer wiper 74 to cause corresponding increase in the reference signal that energizes the opposed coil 69. Thus, the reference voltage signal will automatically follow rise of the output voltage signal. When the output voltage signal after reaching its peak decreases to the point where the magnetic force from coil 69 preponderates over that from coil 68, armature 75 is moved against a contact 80 to close the circuit through the latching relay 44 and thereby cause reversal of the throttle actuating motor 49.

The purpose of time delay relay 81 is to energize potentiometer motor 42 after a time interval corresponding approximately to the time lag in the response of the output voltage signal to reversal of the throttle 51. At the end of this delay period, energization of the motor 42 moves the potentiometer wiper 74 past the high potential end of the resistance element 73 thereby causing the reference signal voltage on the coil 69 to drop. As a result of the drop in reference signal voltage on coil 69, coil 68 causes armature 75 to move to its opposite limit position against the contact 78 to start a new cycle with the reference voltage signal following the rise of the output signal.

It is apparent from the foregoing description that with reference to Fig. 1 voltage in relay coil 68 rises and falls with the changing values of $y$ as the value of $x$ shifts progressively in either direction between the limits $x_1$ and $x_2$. Since the voltage in relay coil 69 follows the increasing values of $y$ as $x$ shifts between $x_1$ and $x_2$, but does not follow the decreasing values of $y$, relay coil 69 provides a reference voltage representing the point in the progressive shift in the value of $x$ at which $y$ is at maximum value. Control operation is based on automatic response to the repeated development of a difference between the signal currents flowing through the two coils.

Our disclosure of the presently preferred embodiment of the invention will suggest to those skilled in the art various changes, substitutions and other departures that properly lie within the spirit and scope of the appended claims.

We claim as our invention:

1. In a peak holding optimalizing control for an operating system of the character described in which an output variable is an optimum function of an input variable for regulating the input variable of the system for peak values of the output variable of the system, the combination of means for progressively varying said input variable reversibly through a range of values thereof causing said output variable to pass through its peak, means producing a signal proportional to said output variable, means producing a reference signal following increase only of said output signal as it increases to its maximum value and said reference signal maintaining its maximum value as said output signal recedes from its peak and becomes less than said reference signal, means for reversing said means to progressively vary said input variable when said output signal becomes less than said input signal, so that said input variable is caused to reciprocate through a range of values corresponding with a peak of said output variable.

2. In a peak holding controller of the character described for regulating an input variable of an operating system for peak values of an output variable that is an optimum function of the input variable, the combination of: means to progressively shift said input variable to cause said output variable to pass through its peak, said progressive means being reversible; two signal circuits; means to energize one of said circuits with an output signal in accord with changes in said output variable whereby the output signal rises and falls in a cycle as said output variable approaches and then passes through its peak value; means to energize the other circuit with progressively increasing reference signal in response to increase of the output signal in said one circuit, whereby the reference signal goes through a cycle of rising to a maximum value as said output variable rises to its peak and of remaining at said maximum value as said output variable falls after passing its peak so that the output signal after passing through its peak becomes less than said reference signal; means to reverse said reversible means when said output signal becomes less than said reference signal, thereby to start a new output signal cycle; and means to reduce said reference signal to start a new reference signal cycle.

3. A combination as set forth in claim 2 in which said reference signal is controlled by a motor driven potentiometer.

4. A combination as set forth in claim 2 in which said two signal currents energize respectively two opposed coils in a differential relay; and in which said reversible means is controlled by said relay.

5. A combination as set forth in claim 4 in which the means to reduce said reference signal current responds to said relay.

6. In a peak holding controller of the character described for regulating an input variable of an operating system for peak values of an output variable that is an optimum function of the input variable, the combination of: means including a reversible motor to progressively shift said input variable to cause said output variable to pass through its peak; a differential relay having a first coil, a second coil, and an armature movable from a neutral position to a first limit position and a second limit position respectively in response to preponderance of current flow in said two coils respectively; means to energize said first coil with an output signal current in accord with changes in said output variable whereby the output signal current rises and falls in a cycle as said output variable approaches and then passes its peak value; means responsive to said armature at said first limit position to energize said second coil with reference signal current whereby the reference signal current goes through a cycle of rising to a maximum value as said output signal rises to its peak and of remaining at said maximum value as said output signal falls after passing its peak so that the output signal after passing through its peak becomes less than said reference signal and causes said armature to move to its second limit position; and means responsive to said armature at said second limit position to reverse said reversible means and to reduce current flow in said second coil to a magnitude for starting a new cycle.

7. A combination as set forth in claim 6 which said reversible means includes a reversible motor controlled by a reversing switch and in which a latching relay actuates said switch in response to said armature at second limit position of the armature.

8. A combination as set forth in claim 6 in which said means to energize said second coil includes a potentiometer and a motor to actuate the potentiometer, said motor being responsive to said armature at said first limit position of the armature.

9. A combination as set forth in claim 8 in which said motor drives said potentiometer in one direction only for repetitive cycles of rising current flow and in which said motor responds to said armature at its second limit position to complete a potentiometer cycle.

10. A combination as set forth in claim 9 which includes a time delay means to delay energization of said motor by said armature at the second limit position of the armature.

11. A combination as set forth in claim 10 in which said reversible means includes a reversible motor controlled by a reversing switch and in which a relay actuates said switch in response to movement of said armature to said second limit position of the armature.

12. In an aircraft automatic cruising control for regulating a power input for peak values of output in miles per unit fuel consumption the combination of: an air speed sensing means; a fuel consumption sensing means; means to progressively shift said power input to cause said output to pass through its peak value, said progressive means being reversible; two signal current circuits; means responsive to said two sensing means to energize one of said two circuits with an output signal in accord with changes of the ratio between the air speed and the rate of fuel consumption whereby current flow in said one circuit changes in accord with changes in said output; means to energize the other circuit with progressively increasing reference signal current in response to increase of current flow in said one circuit whereby the reference signal current goes through a cycle of rising to a maximum value as said output signal current rises to its peak and of remaining at said maximum value as said output signal falls after passing its peak so that the output signal after passing through its peak becomes less than said reference signal; means to reverse said reversible means when said output signal becomes less than said reference signal thereby to start a new output signal cycle; and means responsive when said output signal becomes less than said reference signal to reduce said reference signal to start a new reference signal cycle.

13. In an aircraft cruising control for regulating a power input for peak values of output in miles per unit fuel consumption, the combination of: an air speed sensing means; a fuel consumption sensing means; means to progressively shift said power input to cause said output to pass through its peak value, said progressive means being reversible; two signal circuits; means responsive to said air speed sensing means to generate a signal proportional to air speed; means responsive to said fuel consumption sensing means to generate a signal proportional to the rate of fuel consumption; a first potentiometer responsive to both said signals to provide an output signal proportional to the ratio between air speed and the rate of fuel consumption; a second potentiometer to provide a reference signal in response to increase only of said output signal whereby the reference signal goes through a cycle of rising to a maximum value as said output signal rises to its peak and of remaining at said maximum value as said output signal falls after passing its peak so that the output signal after passing through its peak becomes less than said reference signal; means to reverse said reversible progressive means when said output signal becomes less than said reference signal thereby to start a new output signal cycle; and means operatively connected to said second potentiometer to reduce said reference signal to start a new reference signal cycle.

14. In a peak holding controller of the character described for regulating an input variable of an operating system for peak values of an output variable that is an optimum function of the input variable, the combination of; means to progressively shift said input variable to cause said output variable to pass through its peak, said progressive means being reversible; an output signal circuit; means to energize said circuit in accord with changes in said output variable whereby the output signal rises and falls in a cycle as said output variable approaches and then passes its peak value; a reference signal circuit; a variable signal source to energize said reference signal circuit; means to vary said source in response to increase in signal in said output signal circuit whereby the reference signal current goes through a cycle of rising to a maximum value as said output rises to its peak and of remaining at said maximum value as said output variable falls after passing its peak so that the output signal after passing through its peak becomes less than said reference signal; means to reverse said reversible means when the signal in the output signal circuit is less than the signal in the reference signal circuit thereby to start a new cycle of changes in signal in said output signal circuit and means to reduce signal in said reference signal circuit to start a new reference signal cycle.

15. A combination as set forth in claim 14 in which said variable signal source comprises a variable potentiometer and power means for actuating said potentiometer, said power means being responsive to increases in signal in said output signal circuit.

16. A combination as set forth in claim 15 in which said potentiometer and power means are unidirectional devices for operation in repetitive cycles in which the signal progressively increases in said reference signal circuit throughout the cycle and in which said power source actuates said potentiometer to complete said cycle in response to said predetermined difference in signals in the two circuits to set said potentiometer for a new cycle.

References Cited in the file of this patent

UNITED STATES PATENTS

| Number | Name | Date |
|---|---|---|
| 2,439,788 | Atkinson | Apr. 20, 1948 |
| 2,521,244 | Moore | Sept. 5, 1950 |
| 2,557,526 | Bobier | June 19, 1951 |